(No Model.)

T. B. WILLIAMS.
ICE TIRE FOR VEHICLE WHEELS.

No. 349,773. Patented Sept. 28, 1886.

Witnesses

Percy C. Bowen.

Inventor,
Thomas B. Williams.
By his Attorneys

UNITED STATES PATENT OFFICE.

THOMAS B. WILLIAMS, OF ORANGE, MASSACHUSETTS.

ICE-TIRE FOR VEHICLE-WHEELS.

SPECIFICATION forming part of Letters Patent No. 349,773, dated September 28, 1886.

Application filed February 6, 1886. Serial No. 191,048. (No model.)

*To all whom it may concern:*

Be it known that I, THOMAS B. WILLIAMS, a citizen of the United States, residing at Orange, in the county of Franklin and State of Massachusetts, have invented new and useful Improvement in Ice-Tires, of which the following is a specification, reference being had to the accompanying drawings.

My invention relates to improvements in ice-tires; and it consists of the novel and peculiar construction and combination of parts, substantially as hereinafter fully set forth, and specifically pointed out in the claims.

The primary object of my invention is to provide a flexible tire that can be readily applied to a tire of a bicycle or other like vehicle, to adapt the same to ride upon the ice without danger of falling or slipping and throwing the rider.

A further object of the invention is to provide improved means for readily attaching and removing the tire from a wheel, to provide means for readily entering and withdrawing from the ice, and to provide a tire which shall be very simple, strong, durable, and light in its construction, thoroughly effective for the purposes designed, easy of application to and removal from the wheel, and cheap and inexpensive of manufacture.

I attain the above objects by the devices illustrated in the accompanying drawings, in which—

Figure 1:
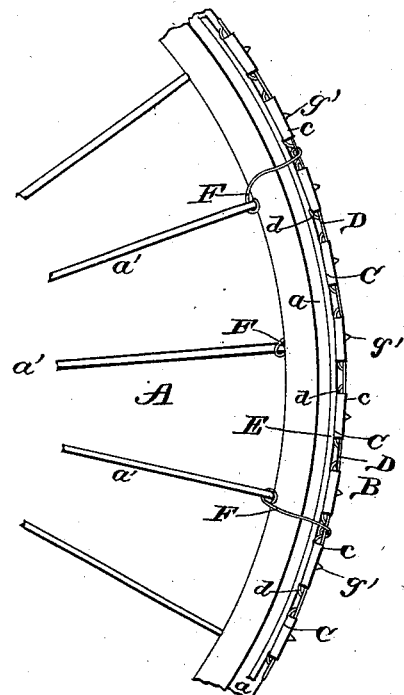
Figure 2:
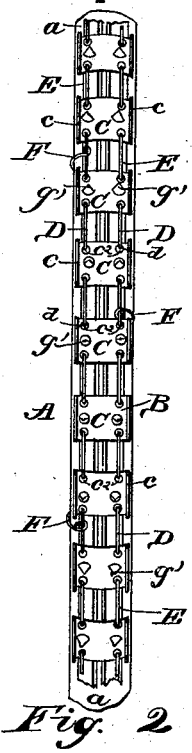
Figure 3:
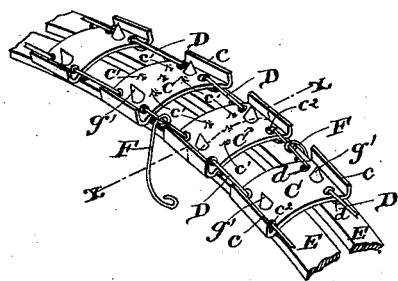
Figure 4:
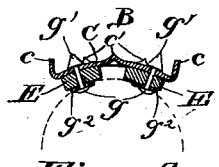

Figure 1 is a portion of a bicycle-wheel in side elevation, having my improved tire applied thereto. Fig. 2 is a front elevation of the devices shown in Fig. 1. Fig. 3 is an enlarged detailed view of a portion of my improved tire, and Fig. 4 is a cross-sectional view on the line $xx$ of Fig. 3.

Referring to the drawings, in which like letters of reference indicate corresponding parts in all the figures, A designates a bicyle-wheel of the ordinary well-known form, having the usual rubber or elastic tire, $a$, and the radial spokes, $a'$; and B, my improved flexible tire, that is adapted to be detachably applied to the rubber tire, to adapt the bicycle to travel on ice, &c. The tire consists of a series of plates, C, links D, connecting the plates loosely together, flexible strips E, to which the plates are permanently attached, and hooks F, connecting the links and the flexible tire to the wheel A, the peculiar construction of the several parts being presently described in detail. The plates C are held apart at a suitable distance from each other, and they lie transversely across the exterior face of the rubber tire $a$. Each plate is curved longitudinally, or in the direction of its length, and the curvature thereof corresponds to that of the rubber tire $a$, so that it can closely and snugly fit the same, and the ends of each plate are bent at an angle to the body thereof to form lips $c$, so that they can readily enter the ice and sustain the wheel in its proper vertical position. If it is deemed necessary or advisable, the body of the plates C may be provided with pointed indentations $c'$, to readily enter the ice.

The plates C are provided at or near their edges with apertures $c^2$, and through these apertures are passed the hooked ends $d$ of connecting-links D. These links are arranged at the ends of the plates, within the plane of the angular lips $c$ thereof, and below the outer face of the curved portion thereof, so as to be out of the way and allow the device to operate without hinderance from the same. The plates are thus loosely or flexibly connected together, and they are adapted to be fitted around the rubber tire and to closely and snugly fit the same, and the flexible tire B is rigidly fastened or connected to the wheel A by means of links F, one end of which is hooked or otherwise connected to the spokes $a$ of the wheel, and at its other the link is hooked or otherwise permanently and loosely connected to the links D or the plates C, as may be found most desirable or efficient. The flexible strips E are disposed one on each side of the rubber tire $a$, and they may be made of leather, rubber, or fabric. Each one of the plates C is permanently attached to and carried by the flexible connecting-strips, and the plates are attached to the strips by studs or rivets $g$. One end of each of the studs has an enlarged head, $g'$, that is made conical and pointed and projects beyond the plate C, to readily enter the ice, and the other end of the rivet or stud is headed down on the under face of the flexible connecting-strips, a washer, $g^2$, being interposed between the headed end of the stud and the flexible strip, to prevent injury to the latter.

From the foregoing it will be observed that I provide a flexible tire which can be readily applied and detached from a vehicle-wheel; that the tire is simple, strong, cheap, and effective; that the angular lips of the transverse plates, the indentations in the plates, and the conical heads of the studs will readily enter the ice, to prevent the wheel from slipping and throwing the rider, and that the flexible tire is very firmly connected to the rubber tire, and there is no danger of the former slipping on the latter.

Having thus fully described my invention, what I claim as new, and desire to secure by Letters Patent, is—

1. An ice-tire having the flexibly-connected plates provided with angular lips at their extremities and arranged transversely of the tire of the wheel when fitted thereon, substantially as described.

2. An ice-tire for vehicle-wheels, comprising a series of flexibly-connected plates arranged transversely across the wheel-tire when fitted thereto, and curved longitudinally to closely embrace the same, the extremities of said plates having angular lips which project beyond the highest point of the concave face thereof, substantially as described.

3. An ice-tire comprising a series of transversely-curved plates provided at their ends with angular lips and flexibly connected together, substantially as described.

4. An ice-tire comprising a series of plates provided with angular lips and links pivotally connected to the plates, to flexibly connect the latter, substantially as described.

5. An ice-tire comprising the flexibly-connected plates and flexible strips to which the plates are permanently attached, substantially as described.

6. The combination, with a wheel, A, of a flexible detachable tire and links connecting the tire and wheel rigidly together, substantially as described.

7. The combination, with a wheel, A, of a detachable flexible tire applied to the outer face thereof and links permanently attached to the flexible tire and detachably hooked or connected to the spokes of the wheel A, substantially as described.

8. An ice-tire comprising the flexibly-connected plates, the flexible strips E, and studs or rivets connecting the plates and strips, and provided with the pointed heads projecting beyond the plates, substantially as described.

9. An ice-tire having a series of transverse plates provided with projecting protuberances and pivoted links intermediate of the plates to flexibly connect them together, substantially as described.

10. An ice-tire provided with a series of transverse plates having the integral indentations projecting beyond the plane thereof and the links intermediate of the plates, substantially as described.

11. An ice-tire comprising a series of flexibly-connected plates and the links F, to detachably secure the tire to the spokes of a wheel, substantially as described.

In testimony that I claim the foregoing as my own I have hereto affixed my signature in presence of two witnesses.

THOMAS B. WILLIAMS.

Witnesses:
 RUFUS D. CHASE,
 OSCAR FULLER.